(12) United States Patent
Rute et al.

(10) Patent No.: US 10,358,111 B2
(45) Date of Patent: Jul. 23, 2019

(54) HEIGHT ADJUSTING DEVICE (71) Applicant: Autoliv Development AB, Vårgårda (SE)

(72) Inventors: Andres Rute, Tallinn (EE); Larissa Melnikova, Tallinn (EE); Pavel Morgunov, Tallinn (EE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 152 days.

(21) Appl. No.: 15/507,598

(22) PCT Filed: Sep. 8, 2015

(86) PCT No.: PCT/EP2015/070470
§ 371 (c)(1),
(2) Date: Feb. 28, 2017

(87) PCT Pub. No.: WO2016/038018
PCT Pub. Date: Mar. 17, 2016

(65) Prior Publication Data
US 2017/0259778 A1 Sep. 14, 2017

(30) Foreign Application Priority Data
Sep. 9, 2014 (DE) ........................ 10 2014 013 079

(51) Int. Cl.
*B60R 22/20* (2006.01)
*B60R 22/24* (2006.01)

(52) U.S. Cl.
CPC ............ *B60R 22/203* (2013.01); *B60R 22/24* (2013.01)

(58) Field of Classification Search
CPC ........ B60R 22/203; B60R 22/24; B60R 22/20
See application file for complete search history.

(56) References Cited

U.S. PATENT DOCUMENTS

| 4,652,012 A * | 3/1987 | Biller .................... B60R 22/203 280/801.2 |
| 4,861,071 A | 8/1989 | Takada |
| RE33,398 E * | 10/1990 | Grunewald ........... B60R 22/201 280/801.2 |
| 5,265,908 A | 11/1993 | Verellen et al. |

(Continued)

FOREIGN PATENT DOCUMENTS

| DE | 31 39 419 A1 | 4/1983 |
| DE | 43 08 366 A1 | 9/1993 |

(Continued)

OTHER PUBLICATIONS

PCT International Search Report—dated Jun. 16, 2012.

(Continued)

Primary Examiner — Barry Gooden, Jr.
(74) Attorney, Agent, or Firm — Brinks Gilson & Lione (57) ABSTRACT A height adjustment device for a belt deflector having a guide rail (10) which has a C-shaped cross section with a base (11) and two side limbs (13) which project in the same direction from the base (11), a carriage (20) which is guided in the guide rail (10) such that it can be displaced and fixed, and a return spring (70) which is fastened to the carriage (20) and is guided within the guide rail (10). At least one of the side limbs (13) having at least one spacer element (15) for spacing the return spring (70) away from the side limb (13).

13 Claims, 6 Drawing Sheets

(56) References Cited

U.S. PATENT DOCUMENTS

| | | | | |
|---|---|---|---|---|
| 5,366,243 | A | * | 11/1994 | Ray .................. B60R 22/203 |
| | | | | 280/801.2 |
| 5,437,475 | A | * | 8/1995 | Sugimoto ............ B60R 22/203 |
| | | | | 280/801.2 |
| 5,908,205 | A | * | 6/1999 | Griesemer ........... B60R 22/203 |
| | | | | 280/801.2 |
| 5,911,439 | A | | 6/1999 | Pleyer et al. |
| 5,924,731 | A | * | 7/1999 | Sayles ................. B60R 22/203 |
| | | | | 280/801.2 |
| 5,941,566 | A | | 8/1999 | Holzapfel et al. |
| 7,461,866 | B2 | * | 12/2008 | Desmarais ........... B60R 22/202 |
| | | | | 280/801.2 |
| 9,027,964 | B2 | | 5/2015 | Neero et al. |
| 9,809,193 | B2 | * | 11/2017 | Marriott ............... B60R 22/203 |
| 2014/0042282 | A1 | * | 2/2014 | Neero .................. B60R 22/203 |
| | | | | 248/297.31 |
| 2017/0259778 | A1 | * | 9/2017 | Rute ..................... B60R 22/24 |
| 2017/0267208 | A1 | * | 9/2017 | Marriott ............... B60R 22/203 |

FOREIGN PATENT DOCUMENTS

| | | |
|---|---|---|
| DE | 196 26 799 A1 | 10/1997 |
| DE | 199 51 293 A1 | 4/2001 |
| DE | 10 2007 026 127 A1 | 12/2008 |
| DE | 10 2008 052 850 A1 | 4/2010 |
| DE | 20 2011 001 235 U1 | 4/2011 |
| EP | 0 307 784 A2 | 3/1989 |
| EP | 0 307 784 B1 | 4/1992 |
| EP | 0 800 968 A2 | 10/1997 |

OTHER PUBLICATIONS

PCT International Search Report—dated Nov. 23, 2015.
International Search Report of PCT/EP2012/000857 dated May 16, 2012.
International Search Report of PCT/EP2015/070470 dated Nov. 23, 2015.

* cited by examiner

HEIGHT ADJUSTING DEVICE

CROSS REFERENCE TO RELATED APPLICATIONS

This application claims priority to German Patent Application No. 10 2014 013 079.7, filed on Sep. 9, 2014 and PCT/EP2015/070470, filed on Sep. 8, 2015.

FIELD OF THE INVENTION

The invention relates to a height adjustment device for a belt deflector for a motor vehicle seat belt restraint system having a guide rail which has a C-shaped cross section with a base and two side limbs which project in the same direction from the base, a carriage which is guided in the guide rail such that it can be displaced and fixed, and a return spring which is fastened to the carriage and is guided within the guide rail.

BACKGROUND

Safety belts in motor vehicles serve as passive restraint elements which are predominantly configured as three-point belts. A belt deflector or guide loop is arranged in the region of the shoulder, over which belt deflector the belt strap is deflected from a retractor which is arranged on the floor side and is guided to a belt buckle which is arranged next to the seat. The end which is remote from the belt retractor is fixed on that side of the vehicle seat which lies opposite the belt buckle. The deflecting device can be fixed rigidly on a structural component, for example a B-pillar.

The fixing usually takes place via a screw connection. The screw connection has the disadvantage that the height of the deflecting point cannot be set to the respective size of the user. If the deflecting point is too high, pressure points can occur in the occupant's neck region, and if the deflecting point is too low, there is no correct guidance of the belt strap over the shoulder of the occupant, with the result that the restraint action may not be optimal.

Height-adjustable belt deflectors are known which are mounted displaceably in a guide rail such that they can be fixed at defined intervals. A locking action is unlatched via an actuating element, the deflector is displaced in the rail and is fixed in the desired position in the latch. In order to facilitate the adjustment, the deflector is assigned a return spring which usually acts counter to the direction of gravity and facilitates pushing upwards of the carriage and therefore of the belt deflector.

It is one stipulation for height adjustment devices that they have to be capable of being arranged on the respective structural component in a manner which is as inconspicuous as possible within an interior trim part. This necessitates that all the components are configured to be of as small a size as possible and there is only a small amount of installation space both for the guide rail and for the components which are arranged in the guide rail. On account of the constricted space conditions, canting of the return spring can occur within the guide rail, which impairs the reliable adjustability of the belt deflector.

SUMMARY AND INTRODUCTORY DESCRIPTION OF THE INVENTION

It is an object of the present invention to provide a height adjustment device for a belt deflector, which has increased reliability with regard to the actuation capability.

According to the invention, this object is achieved by way of a height adjustment device having the features of the main claim. Advantageous refinements and developments of the invention are disclosed in the subclaims, the description and the figures.

The height adjustment device for a belt deflector, having a guide rail which has a C-shaped cross section on a base and two side limbs which project in the same direction from the base, a carriage which is guided on the guide rail such that it can be displaced and fixed, and a return spring which is fastened to the carriage and is guided within the guide rail, provides that at least one of the side limbs has at least one spacer element for spacing the return spring away from the side limb. The displacement of the carriage and therefore of the belt deflector, for example, counter to the direction of gravity is facilitated by way of the return spring which is arranged within the guide rail. Here, however, the return spring can bear against the side limb and can cant there, as a result of which the reliability of the restoring movement or adjusting movement is reduced. The spacer elements or the spacer element protrude/protrudes inwards into the receiving space in the middle of the guide rail for the carriage and thus avoid/avoids that the return spring bears directly against the inner wall of the side limbs and cants there. The spacer element is necessarily smaller, in particular shorter and/or flatter than the inner wall of the side limbs, with the result that a comparatively small contact area is formed between the return spring and the surface of the spacer element, as a result of which the tendency to become wedged is reduced. The spacer element can also extend over the entire height of the side limbs, as a result of which all contact of the return spring with the inner side of the side limbs is prevented reliably at this point. As an alternative, the spacer element can extend only over part of the height of the side limb, in order to save material and weight and, moreover, to further reduce the contact area with the return spring. A plurality of spacer elements can also be arranged distributed above one another, that is to say over the height of the side limbs, and/or behind one another, that is to say along the longitudinal extent of the guide rail.

The guide rail can have two parallel side limbs which extend away from the base. A roof limb can extend from at least one side limb in the direction of the side limb which lies opposite; if two roof limbs are provided, they are oriented substantially towards one another, with the result that the carriage cannot be moved out of the guide rail orthogonally with respect to the base. There is displaceable mounting of the carriage in the guide rail merely in the longitudinal extent of the guide rail, in particular if the guide rail is delimited upwards by one or more roof limbs, there being a clearance between the ends of the roof limbs, with the result that the belt deflector or a fastening element for a belt deflector can be guided along the guide rail. The delimitation toward the top by way of the roof limb or the roof limbs also delimits the space of the return spring, with the result that there is a reduction in the available overall height in the inner wall region of the side limbs, in particular, in the transition region from the base to the side limbs and from the side limbs to the roof limbs on account of the radii which are present there, which signifies an additional risk of jamming if the return spring is pressed laterally onto the side limb. However, the guidance of the carriage is improved by way of the roof limbs.

In one variant of the invention, the guide rail is configured in one piece, in order to avoid mounting steps during production. Here, the guide rail can be produced from a basic blank, for example made from metal or metal alloy, in a forming method, in particular by way of bending and pressing of the respective regions of the guide rail, after recesses have been punched out. It is also possible to produce the guide rail first of all in a primary forming method, in particular the basic form with the base, the side limbs and optionally the roof limbs, in order subsequently to perform finishing of the form by way of material-removing methods or forming methods. The spacer element can be formed on the side limbs by way of primary forming.

The spacer element itself can be formed from the side limb, for example by being pushed in, being pushed through or being pressed in, with the result that an inwardly directed protuberance is formed in the region of the side limbs. As an alternative to a spacer element which is configured in one piece, it is possible that the spacer element is arranged as a separate component on the inner side of the side limbs or protrudes into the region between the two side limbs, in order thus to keep the return spring spaced apart from a side limb. The separate spacer element can be adhesively bonded, screwed on or welded; it is likewise possible to achieve fastening of the spacer element or the spacer elements via sprung positively locking connections, for example clips or the like, in the case of which fastening no additional components are required.

One variant of the invention provides that the return spring is configured as a helical spring which has the advantage that it takes up only a small amount of space within the guide rail and can be guided parallel to the course of the inner wall of the side limb within the guide rail. The helical spring is preferably constructed in a similar manner to a clockwork spring and has a fundamentally strip-like form made from a preferably metallic material. One end is connected to the carriage, whereas the other end is rolled up or wound in one plane. The end which is fixed to the carriage can be pulled out, with the result that the spring strip extends along the side limb in the tensioned position. The helical spring can be mounted in a spring cassette which is arranged at one end of the guide rail; it is likewise possible that the spring cassette is coupled directly to the guide rail, with the result that the spring cassette can be formatted as a module together with the guide rail. The module comprising guide rail with carriage arranged therein and return spring which is fastened thereto and is guided in a spring cassette can be provided in a completely pre-assembled state for final assembly, with the result that the guide rail then only has to be fastened to the structural component and the belt deflector with the belt strap has to be fixed to the carriage. If the carriage is moved from an upper position, in which the return spring is relieved, into a lower position after a mechanical lock has been released, the helical spring is deflected, that end of the helical spring which is connected to the slide is pulled out of the spring cassette and the helical spring is tensioned, with the result that, in the case of a reverse movement, the displacement of the carriage is facilitated by way of the elastic restoring forces of the helical spring.

One further feature of the invention provides that a plurality of spacer elements are arranged on the side limb over the longitudinal extent of the guide rail, in order to prevent jamming or canting of the return spring in the region of the side wall over the entire length of the guide rail.

The return spring is fastened to the carriage and is preferably guided along between the carriage and the side limb, in order firstly to provide guidance for the return spring and secondly to prevent canting over the spacer element.

The spacer element protrudes inward, that is to say in the direction of the carriage, at least to such an extent as an existing curvature, for example, in the transition region from the base to the side limb reduces the available installation height for the spring. In order to ensure that the complete clear distance between the roof limb and the base is available as installation space and displacement path for the return spring, it is provided that the spacer element projects inwards at least as far as the beginning of the transition from the base to the side limb, with the result that no bending radii or production radii reduce the installation space.

BRIEF DESCRIPTION OF THE DRAWINGS

In the following text, exemplary embodiments of the invention will be explained in greater detail using the appended figures, in which.

DETAILED DESCRIPTION

Figure 1:
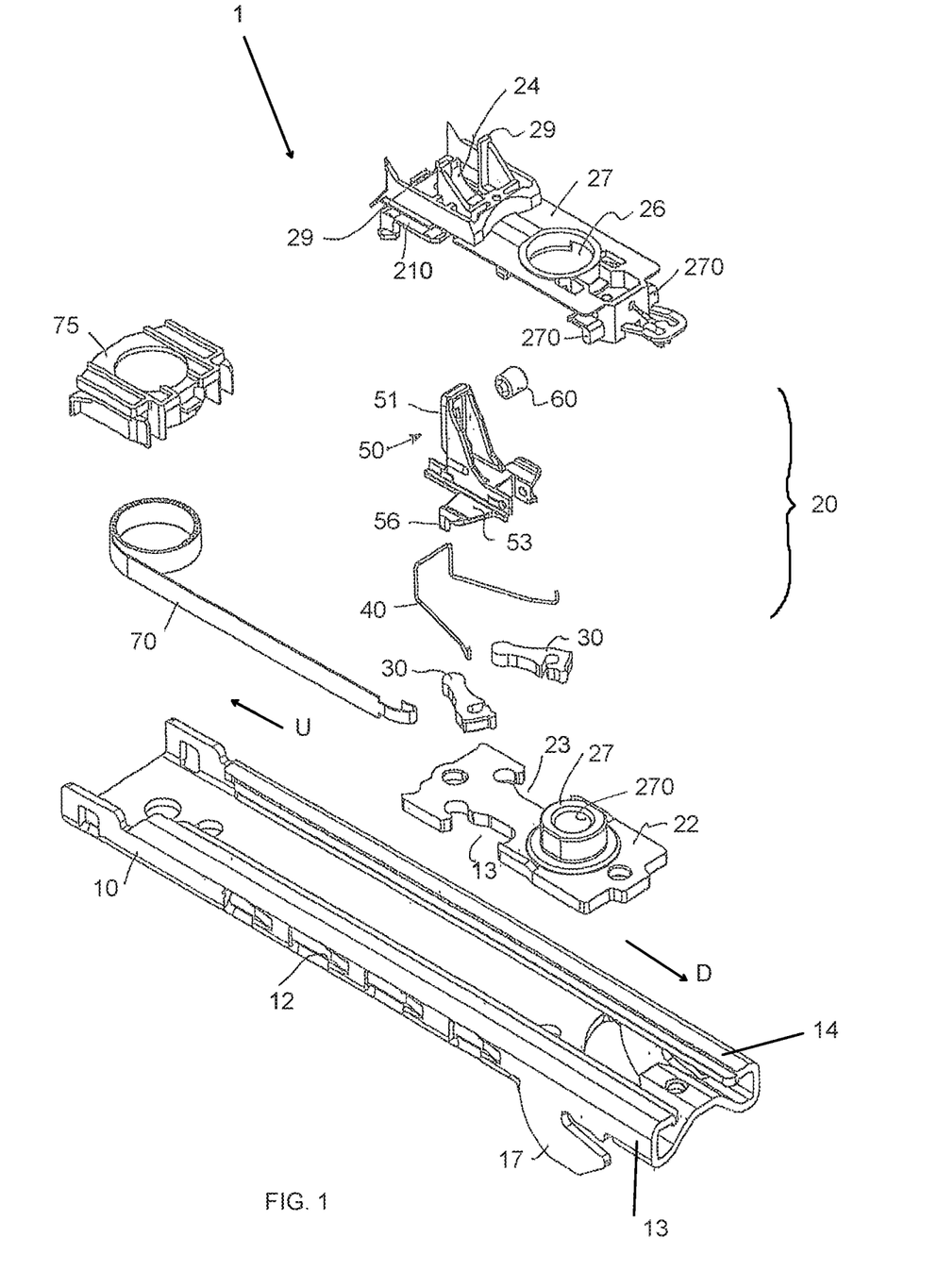
FIG. 1 shows an exploded illustration of a system having a height adjustment device and a guide rail.

FIG. 1 shows a height adjustment device 1 for installation in a vehicle having a rail 10 and a return spring 70 which is fixed via a fastening device 75 to the rail 10 which serves as guide rail.

The height adjustment device 1, also called height adjustment rail, having a belt deflector or guide loop (not shown), by way of which the seat belt webbing is guided and deflected, provides a carriage 20 which, in the exemplary embodiment which is shown, consists of two components, namely a main body 21 and a slide 22. The main body 21 is manufactured as a complex injection molded part and has bevels 29 for an actuating element 50 and a recess 26 for a positively locking element 30 for connection to the slide 22. Further components are provided, for example guide journals 210 which lie below a bottom plane, which rests on the rail 10, of the main body 21 and ensure that the main body 21 is guided within the rail 10. In the mounted state, the guide journals 210 are arranged below the inwardly bent-over sections of the guide rail 10, whereas the bottom plane of the main body 21 is positioned above these sections.

The slide 22 is of substantially disc-shaped or plate-shaped configuration and has a substantially rectangular contour which is designed in such a way that the slide 22 can be mounted displaceably within the guide rail 10, without it being possible for it to be removed from the guide rail 10 orthogonally with respect to the plane of displacement. A journal 27 protrudes as positively locking element beyond the bottom plane of the slide 22, which journal 27 is configured to engage into the recess 26 of the main body 21, in order thus to complete the carriage 20. A thread 270 is formed within the journal 27, into which thread 270 a screw can be screwed for fastening the belt deflector which can be configured as an eyelet or triangle, in order to complete the height adjustment device 1 during final assembly. The slide 22 moves on or below the plane of the guide journals 210 and ensures that the slide 22 and the main body 21 can be displaced together with one another along the longitudinal extent of the guide rail 10.

Two recesses 23 are arranged within the slide 22, into which recesses 23 locking elements 30 can be introduced. The recesses 23 are arranged on longitudinal sides of the slide 22 which lie opposite one another and serve to receive the locking elements 30 which have substantially the same material thickness as the slide 22, with the exception of the journal 27. The locking elements 30 are coupled to a spring 40 which serves in the mounted state to press the locking elements 30 outwards, with the result that the locking elements 30 are pressed in the direction of the lateral outer walls of the guide rail 10. As a result, it is ensured that the locking elements 30 are moved into a locking position when they are aligned with positively locking elements 12, for example in the form of recesses or apertures within the side walls of the guide rail 10.

The actuating element 50 is mounted between the slide 22 and the main body 21, which actuating element 50 has a base 53 and a lever 51 which is oriented substantially perpendicularly with respect to the plane of the base 53. In the mounted state, the lever 51 protrudes beyond stops 29 which limit a displacement in the actuating direction of the actuating element 50.

In the mounted state, the slide 22 is introduced into the guide rail 10. The locking elements 30 are arranged in the recesses 23 of the slide 22 and are mounted such that they can be pivoted within the plane of displacement or can be pivoted parallel to the bottom plane of the slide 22 on account of the round head sections of the locking elements 30 and the corresponding receptacles within the recess 23. Via the spring 40, the locking elements 30 are pressed outwards against the side walls of the guide rail 10, with the result that, in the case of a corresponding orientation, they engage into the recesses or positively locking elements 12 within the guide rail 10 and block a displacement in the downward direction of displacement "D". The actuating element 50 is positioned above the slide 22, which actuating element 50 has engagement sections 56 on its base 53, which engagement sections 56 press the locking elements 30 inwards counter to the spring force by way of the spring 40 in the case of a displacement of the actuating element 50, with the result that they are received within the recesses 23 in the slide and do not protrude beyond the maximum width of the slide 22 or are displaced inwards to such an extent that they do not pass into engagement with positively locking elements 12 of the guide rail 10.

The lever 51 penetrates a recess (not visible in FIG. 1) within the main body 21, with the result that the base 53 is guided displaceably between the upper side of the slide 22 and the underside of the main body 21. The underside of the lever 51 bears against the spring 24 under stress. The spring 24 is arranged between the two stops 29 which serve at the same time as the lateral guides for the actuating element, and is formed on the main body 21. In the case of an embodiment of the main body 21 as a single-piece plastic component, the spring 24 which is configured as a bent spring tongue is formed in one piece.

A return spring 70 is arranged at the upper end of the guide rail 10, that is to say that end which is situated counter to the downward direction of displacement D, which return spring 70 is fastened to the guide rail 10 via a fastening element which is configured as a spring cassette 75. The return spring 70 is configured as a flat spiral spring and facilitates pulling back of the carriage 20 into the starting position or in a displacement counter to the downward direction of displacement D. Latching hooks 17 are bent out at that end of the guide rail 10 which lies opposite the spring cassette 75, via which latching hooks 17 the guide rail 10 can be fixed in a positively locking manner on a vehicle B-pillar (not shown) or the like.

Figure 2:
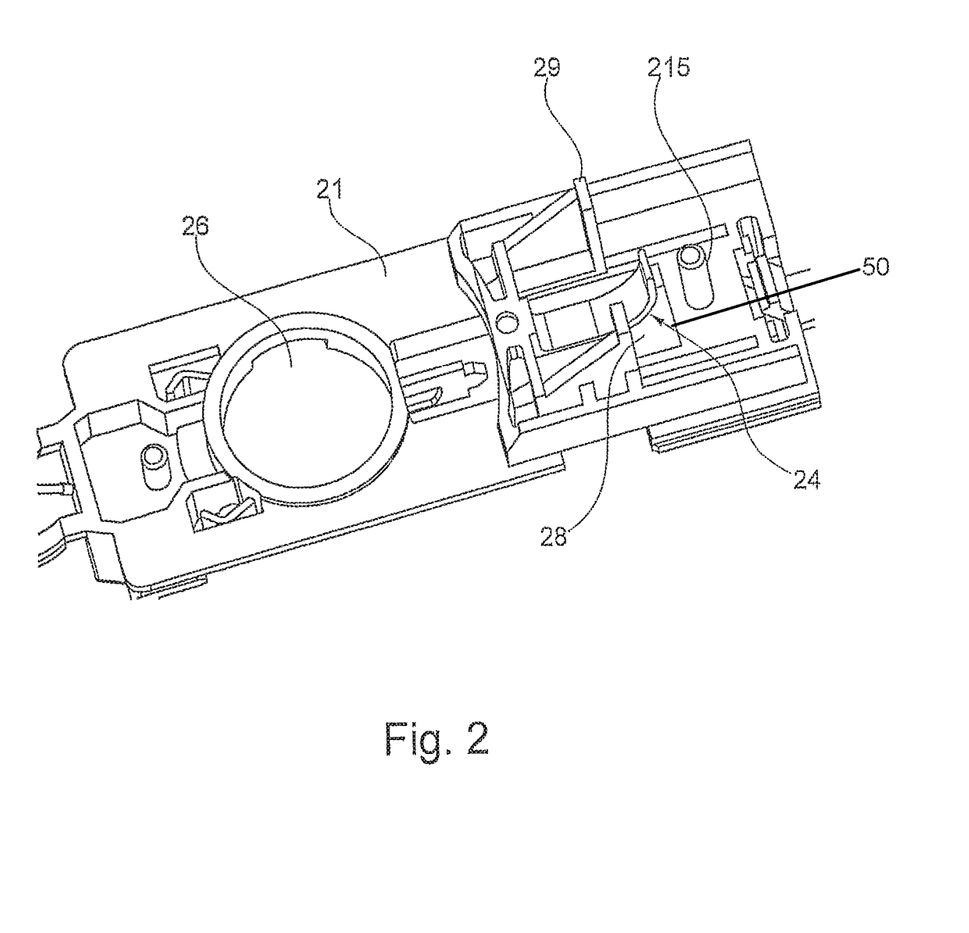
FIG. 2 shows a detailed view of a main body.

FIG. 2 shows the main body 21 in an enlarged detailed illustration. In addition to the main body 21 and the recess 26 formed therein for receiving the journal 27 (not shown) of the slide 22, and in addition to the spring 24 which is formed in one piece, the recess 28 for guiding through the lever 51 and the two stops 29 can be seen, via which the maximum displacement travel of the actuating element 50 is limited. The spring 24 which is formed in one piece has a bent shape, with the result that the spring 24 can slide along on the underside of the lever 51 during a displacement of the actuating element 50 in the direction of displacement counter to the prestressing force. The spring 24 can also be of separate configuration and can be fastened to the main body 21. The spring 24 is bent upwards during a displacement of the actuating element. If the actuating force is reduced or drops away, the spring 24 presses the actuating element 50 back into its starting position, until the actuating element 50 bears against an upper-side stop 215. The actuating element 50, more precisely the lever 51, is clamped in between the spring 24 and the upper-side stop 215 by way of the prestressing force of the spring 24 and is held reliably there, with the result that no undesirable rattling noise is produced by way of the actuating element 50 during operation of the vehicle.

Figure 3:
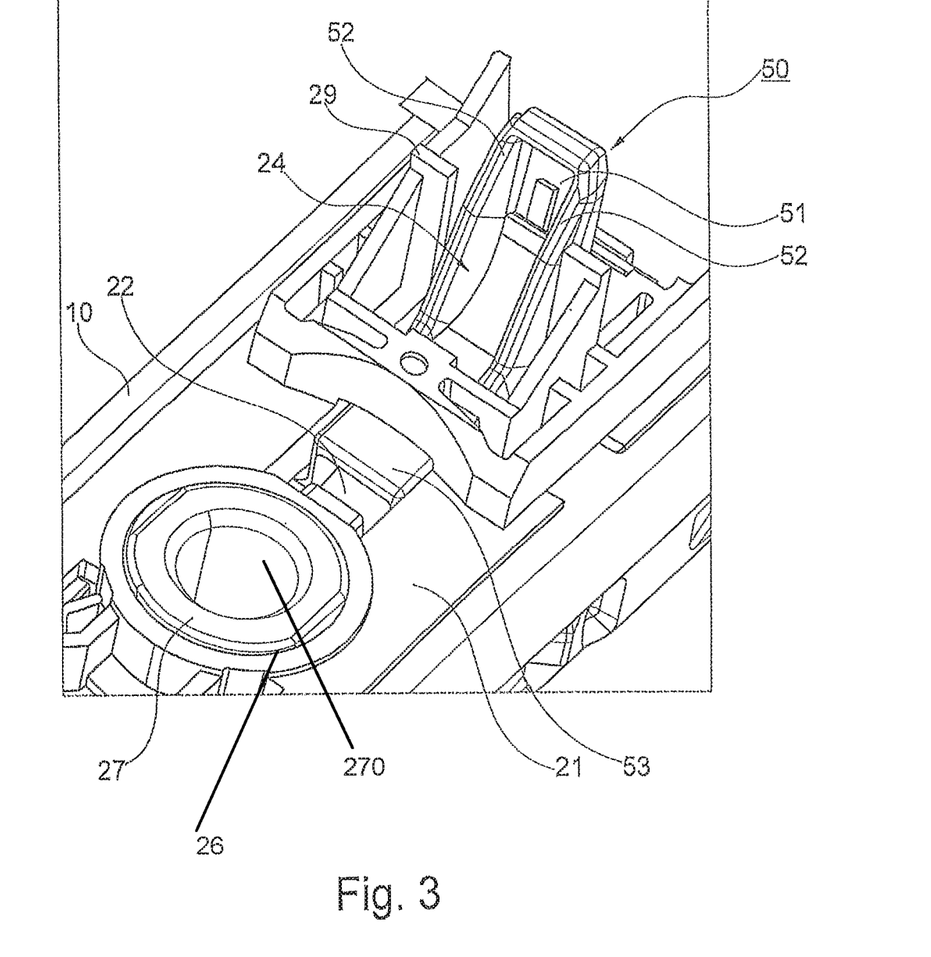
FIG. 3 shows a detailed view of the height adjustment device in the mounted state.

FIG. 3 shows a finally assembled system of guide rail 10 and carriage 20 in a detailed view. The slide 22 is inserted within the guide rail 10 and the journal 27 penetrates the recess 26 within the main body 21. The guide journals which cannot be seen in FIG. 3 are received within the guide rail 10, and the main body 21 with its bottom plane covers the guide rail 10, with the result that both the main body 21 and the entire height adjustment device with the deflector (not shown) are held reliably within the guide rail 10. The actuating element 50 is guided through the recess 28 within the main body 21, with the result that the lever 51 protrudes beyond the plane of the guide rail 10. The lever 51 has two lateral guide devices 52 which are spaced apart from one another and form a supporting bracket on both sides of the spring 24, with the result that the spring 24 is received within the actuating element 50. The spring 24 bears against the underside of the lever 51 and is flanked by the lateral guide devices 52 on sides which lie opposite one another. It can be seen that the base 53 of the actuating element 50 is arranged between the slide 22 and the upper bottom plane of the main body 21, with the result that the actuating element 50 is guided displaceably between the slide 22 and the main body 21. Roller 60 shown in FIG. 1 facilitates movement of actuating element 50.

Figure 4:
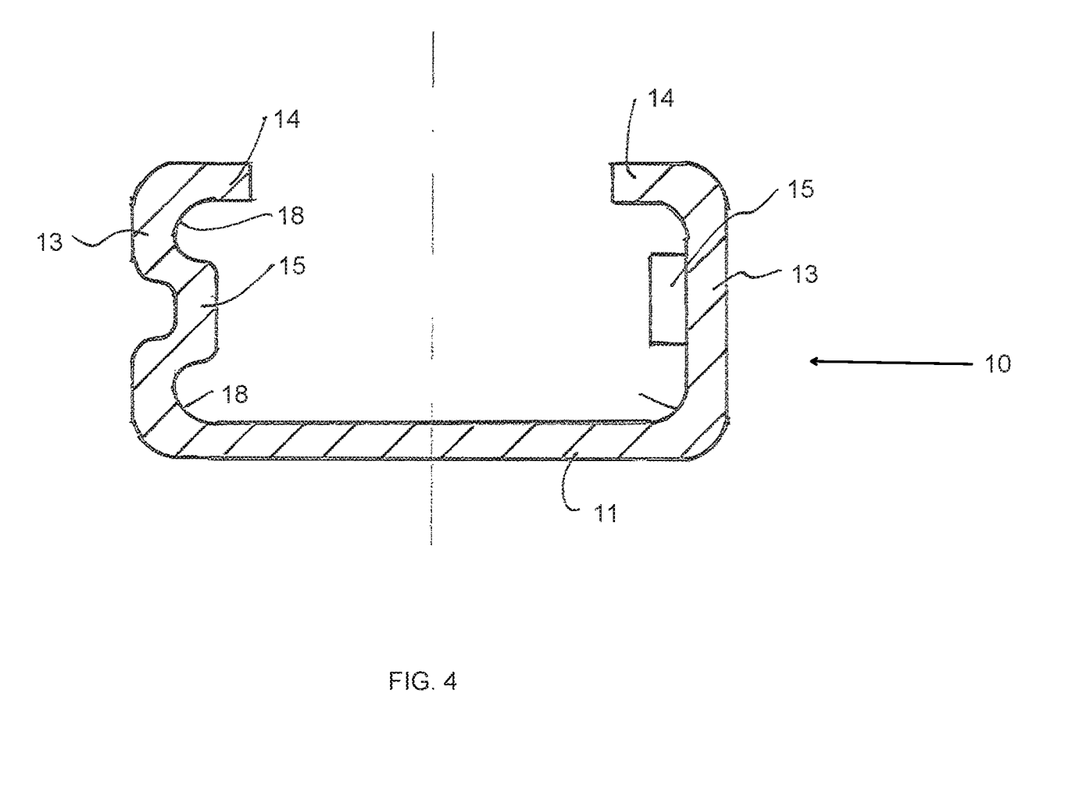
FIG. 4 shows a cross-sectional view of a guide rail.

FIG. 4 shows a cross-sectional view of a guide rail 10 having a base 11 and two side limbs 13 which project upwards from the base 11 and at the ends of which, which lie opposite the base 11, in each case one upper limb 14 protrudes inwards, with the result that a substantially C-shaped cross section is formed. Opposite the base 11, a clearance is formed between the upper limbs 14, with the result that, for example, the journal 27 of the carriage 20 can be guided therethrough. The guide rail 10 is configured as a single-piece component which has been bent out of a basic metal blank. The left-hand (as shown in FIG. 4) side limb 13 has a spacer element 15 which protrudes into the interior of the guide rail 10. The spacer element 15 is formed from the side limb 13 and protrudes inwards to such an extent that it terminates with the bending radii 18 from the transition of the base 11 to the side limbs 13 or, moreover, protrudes inwards, with the result that it is ensured that the entire clear distance between the upper limb 14 and the base 11 is available when the return spring 70 is guided along on the inner side of the side limbs 13. Complete contact of the return spring 70 (not shown) with the side wall is therefore not possible and jamming of the strip-shaped return spring 70 in the bending radii 18 which reduce the installation space between the roof limb 14 and the base 11 is avoided.

One variant of the invention is shown in FIG. 4 on the inner side of the right-hand side limb 13, in which variant the spacer element 15 is configured as a separate component and is fastened to the side limb 13 within the guide rail 10, for example is screwed on, adhesively bonded, welded or clamped in, for example via positively locking elements and spring clips. Unlike on the left-hand side limb 15, in which the spacer element 15 is formed from the side limb by way of a forming method, for example pushing or pressing, and is configured as a bead, the right-hand spacer element 15 is configured as a separate component which can also be produced from a material which is different from the material of the guide rail 10. As a result, the different requirements of the mechanical stability of the guide rail 10 and the spacer element 15 can be taken into consideration, and the spacer element 15 can be of lighter configuration. If the spacer element 15 is configured as a separate component, it can also be produced from plastic, as a result of which firstly weight can be saved and secondly improved sliding properties of the return spring 70 on the surface of the spacer element 15 can be achieved.

The upper limbs 14 prevent it being possible for the carriage 20 to be moved out of the guide rail 10 in the direction away from the base 11.

Figure 5:
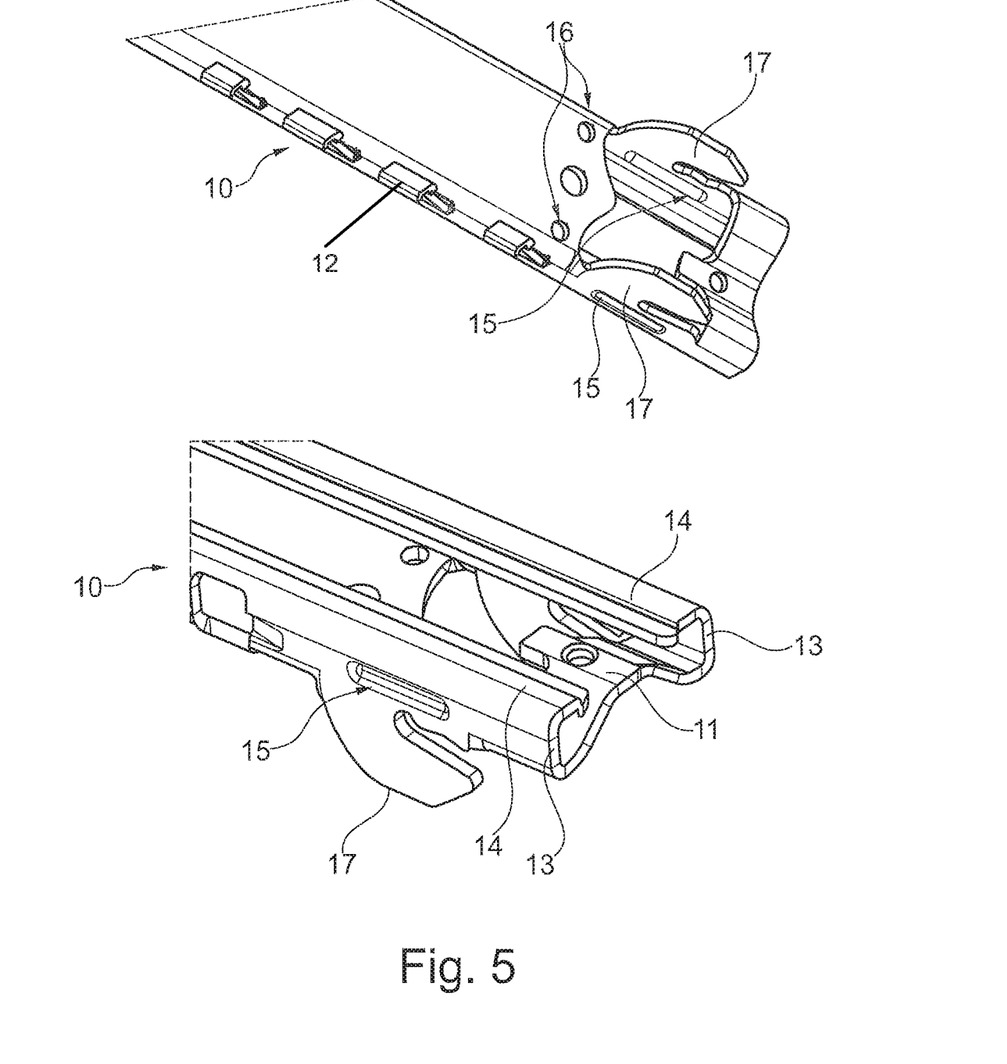
FIG. 5 shows detailed views of a guide rail in plan view and bottom view.

FIG. 5 shows two detailed views of a guide rail 10 in plan view and bottom view, the lower illustration showing the perspective plan view and the upper illustration showing the perspective bottom view. Here too, the guide rails 10 are configured in one piece and are formed, namely bent out, from a basic blank. Inwardly directed beads are formed, namely pressed inwards, from the side limbs 13 as spacer elements 15, with the result that a return spring 40 is held spaced apart from the inner side of the side limbs 13. The bent-out latching hooks 17 can be seen in an end region of the guide rail 10, which latching hooks 17 have likewise been formed in one piece from the guide rail 10. The latching hooks 17 are formed on sides of the base 11 which lie opposite one another and protrude from the said base 11 in an opposite orientation with respect to the side limbs 13. In the region of the latching hooks 17, the beads and spacer elements 15 are embossed or formed into the side limbs 13 and, in addition to the embodiment as a spacer element 15, also serve to increase the mechanical stability of the guide rail 10 in the region of the latching hooks 17.

It can be seen in the upper illustration in FIG. 5 that relief holes 16 are provided in the forming region in the base 11, which relief holes 16 surprisingly increase the durability of the guide rail 10, since they prevent the sheet metal hooks 17 being torn out and make plastic deformation of the guide rail 10 possible in this region.

Figure 6:
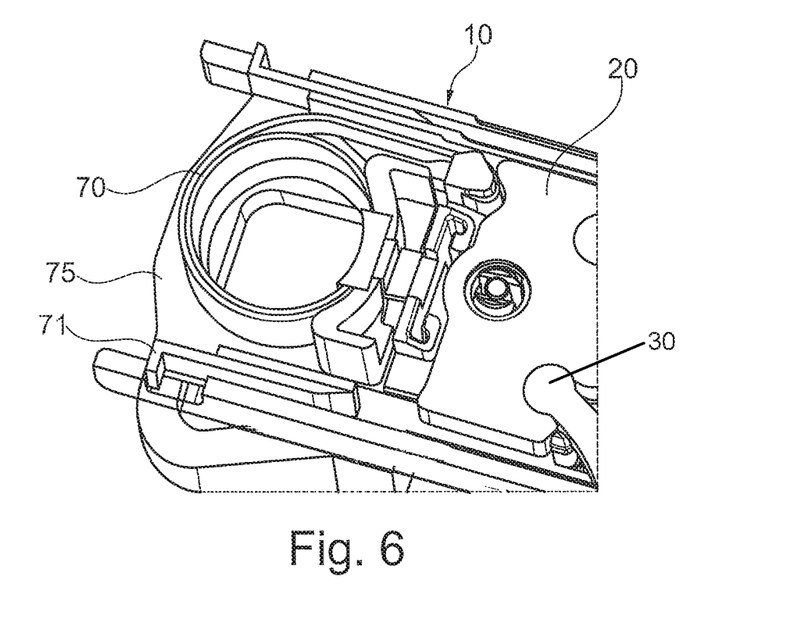
FIG. 6 shows a detailed view of the height adjustment device in a starting position.

FIG. 6 shows a perspective detailed view of a height adjustment device in the mounted state in the starting position. The guide rail 10 is fitted with the carriage 20, to which a belt deflector (not shown) can be fastened, for example to the journal 27. The spring cassette 75 is arranged at the upper end of the carriage 20, in which spring cassette 75 the helically formed return spring 70 is mounted. The spring cassette 75 is fixed in a positively locking manner on corresponding recesses within the guide rail 10 via spring tabs 71 which are formed in one piece on the spring cassette 75, with the result that the guide rail 10 is provided together with the carriage 20 and the spring cassette 75 as a module which can be pre-assembled. The return spring 70 is wound in one plane and makes it possible for the end which is fastened to the carriage 20 to be pulled out of the spring cassette 75 and for the return spring 70 to be tensioned by way of the pulling out. In FIG. 6, the return spring 70 is relieved; that is to say, the carriage 20 is situated in the starting position, usually in the highest maximum latching position.

Figure 7:
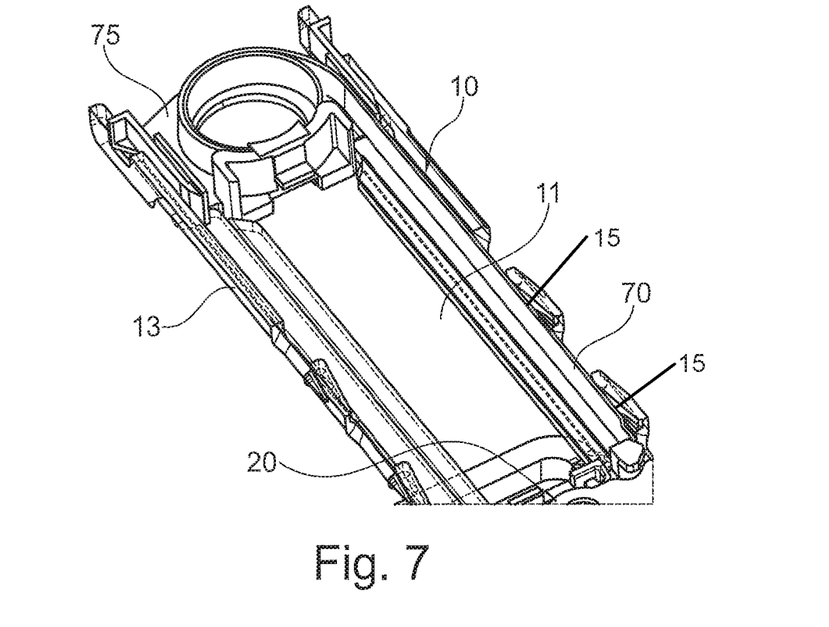
FIG. 7 shows a detailed view of the height adjustment device in an end position.

FIG. 7 shows the height adjustment device according to FIG. 6 in the end position, in which the carriage 20 is guided downwards to a maximum extent within the guide rail 10. It can be seen that the return spring 70 is configured as a spring strip and is guided within the C-shaped guide rail 10. The end which is guided on the carriage 20 is guided between the outer side of the carriage 20 and the inner side of the side limb 13. The spacer elements 15 which are arranged spaced apart from one another, are situated distributed over the longitudinal extent of the guide rail, and are covered in FIG. 7 by the spring 70 which has been pulled out space the return spring 70 apart from the inner sides of the side limbs 13 in such a way that contact of the return spring 70 is avoided in the region of the curvature radii 18 of the guide rail 10.

While the above description constitutes the preferred embodiment of the present invention, it will be appreciated that the invention is susceptible to modification, variation and change without departing from the proper scope and fair meaning of the accompanying claims.

The invention claimed is:

1. A height adjustment device for a belt deflector comprising, a guide rail which has a generally C-shaped cross section with a base and first and second side limbs which project in a same direction from the base, the guide rail first and second side limbs are parallel, and having at least one upper limb which is oriented from the first side limb in a direction of the second side limb which lies opposite, a carriage which is guided in the guide rail such that it can be displaced between the first and the second side limbs along the guide rail and fixed, and a return spring which is fastened to the carriage and is guided within the guide rail between the first and second side limbs, at least one of the first and the second side limbs has at least one spacer element for spacing the return spring away from portions of at least one of the first and the second side limbs.

2. A height adjustment device according to claim 1 further comprising, in that the guide rail is configured in one piece.

3. A height adjustment device according claim 1 further comprising, in that the guide rail is produced from a basic blank in a forming method.

4. A height adjustment device according claim 1 further comprising, in that the spacer element is formed out of at least one of the first and the second side limbs.

5. A height adjustment device according to claim 1 further comprising, in that the return spring is guided along between the carriage and at least one of the first and the second side limbs.

6. A height adjustment device according to claim 1 further comprising, the spacer element projects inwards at least as far as a beginning of a first transition from the base to at least one of the first and the second side limbs forming a first radius, and at least as far as a beginning of a second transition from at least one of the first and the second side limbs to the upper limb forming a second radius.

7. A height adjustment device according claim 1 further comprising, in that the return spring is configured as a helical spring.

8. A height adjustment device according to claim 7 further comprising in that the helical spring is mounted in a spring cassette which is arranged at one end of the guide rail.

9. A height adjustment device for a belt deflector comprising, a guide rail which has a generally C-shaped cross section with a base and first and second side limbs which project in a same direction from the base, a carriage which is guided in the guide rail such that it can be displaced between the first and the second side limbs along the guide rail and fixed, and a return spring which is fastened to the carriage and is guided within the guide rail, between the first and the second side limbs, at least one of the first and the second side limbs has at least one spacer element for spacing the return spring away from portions of at least one of the first and the second side limbs, a plurality of the spacer elements are arranged on the at least one of the first and the second side limbs over at least a portion of a longitudinal extent of the guide rail.

10. A height adjustment device for a belt deflector comprising, a guide rail which has a generally C-shaped cross section with a base and first and second side limbs which project in a same direction from the base, a carriage which is guided in the guide rail such that it can be displaced between the first and the second side limbs along the guide rail and fixed, and a return spring which is fastened to the carriage and is guided within the guide rail, between the first and the second side limbs, at least one of the first and the second side limbs has at least one spacer element for spacing the return spring away from portions of at least one of the first and second side limbs, the spacer element projects inwards at least as far as a beginning of a transition from the base to at least one of the first and the second side limbs.

11. A height adjustment device according to claim 10 further comprising, the transition in the form of a bending radius.

12. A height adjustment device for a belt deflector comprising, a guide rail which has a generally C-shaped cross section with a base and first and second side limbs which project in a same direction from the base, a carriage which is guided in the guide rail such that it can be displaced between the first and the second side limbs along the guide rail and fixed, and a return spring which is fastened to the carriage and is guided within the guide rail between the first and the second side limbs, at least one of the first and the second side limbs has at least one spacer element for spacing the return spring away from portions of at least one of the first and the second side limbs, the spacer element is separate from the guide rail and is attached to the side rail.

13. A height adjustment device according to claim 12 further comprising, the spacer element is formed of a polymer material.

* * * * *